(12) United States Patent
Reeson

(10) Patent No.: US 7,195,143 B2
(45) Date of Patent: Mar. 27, 2007

(54) BOILER TUBE ALIGNMENT CLAMP

(75) Inventor: William G. Reeson, 6484 Landing Rd., King George, VA (US) 22485

(73) Assignee: William G. Reeson, King George, VA (US)

( * ) Notice: Subject to any disclaimer, the term of this patent is extended or adjusted under 35 U.S.C. 154(b) by 2 days.

(21) Appl. No.: 10/743,154

(22) Filed: Dec. 21, 2003

(65) Prior Publication Data

US 2005/0133564 A1    Jun. 23, 2005

(51) Int. Cl.
*B23K 31/02* (2006.01)
(52) U.S. Cl. ..................... 228/44.5; 228/49.3
(58) Field of Classification Search ............... 228/44.3, 228/44.5, 49.1, 49.3
See application file for complete search history.

(56) References Cited

U.S. PATENT DOCUMENTS

| | | | | |
|---|---|---|---|---|
| 889,315 A | * | 6/1908 | Kenyon | 29/256 |
| 2,638,676 A | * | 5/1953 | Callahan | 33/412 |
| 3,400,872 A | * | 9/1968 | Rogers | 228/44.5 |
| 4,074,897 A | * | 2/1978 | Behn | 269/43 |
| 4,262,943 A | * | 4/1981 | Armstrong | 285/420 |
| 4,415,188 A | * | 11/1983 | Ginter, Jr. | 285/420 |
| 4,464,092 A | * | 8/1984 | Chambers et al. | 414/534 |
| 4,750,662 A | * | 6/1988 | Kagimoto | 228/44.5 |
| 5,165,160 A | * | 11/1992 | Poncelet | 29/464 |
| 5,509,702 A | * | 4/1996 | Warehime et al. | 285/409 |
| 5,645,303 A | * | 7/1997 | Warehime et al. | 285/409 |

\* cited by examiner

*Primary Examiner*—Jonathan Johnson
(74) *Attorney, Agent, or Firm*—Donald W. Meeker

(57) ABSTRACT

A boiler tube alignment clamp with a clamp body having a V-shaped channel and two U-bolts bolted to the clamp body opposite the V-shaped channel for use in aligning and holding in place two sections of boiler tube for welding them together. A jacking screw at each end of the V-shaped channel adjusts the boiler tubes for alignment of interior surfaces when the exterior surfaces are uneven.

4 Claims, 2 Drawing Sheets

BOILER TUBE ALIGNMENT CLAMP

BACKGROUND OF THE INVENTION

1. Field of the Invention

The present invention relates to an alignment tool for use in accurately aligning and holding in place two sections of boiler tube, so that the sections may be coupled end to end by a welding or analogous operation and particularly to a boiler tube alignment clamp.

2. Description of the Prior Art

One problem with the operation of heat exchangers is that the heat, gases, dust and substances or fluids to which they are exposed frequently leads to increased rates of corrosion resulting in damage or defects in the tubes of the heat exchanger and subsequent leakage. A conventional approach to repairing the heat exchanger is to remove a section of the damaged tube, including the defect, over some length, and to install a new replacement tube in its place. The ends of the replacement tube and the stubs of the existing tube are prepared for welding by fitting and beveling surfaces at which they will be joined. Typically, the joining is done manually using shielded metal arc welding. A tube alignment clamp assembly is required to align the ends of the replacement portion with the existing portion of boiler tube prior to welding the two ends together.

Prior art clamps are often cumbersome, sometimes expensive and difficult to use and they often do not provide a large exposed area of the boiler tube ends for welding.

Prior art U.S. Pat. No. 4,750,662, issued Jun. 14, 1988 to Kagimoto, provides a pipe clamping and alignment tool for locating and clamping pipe sections in accurate end to end alignment for welding. The device has a pair of clamping assemblies for the respective pipe sections threaded respectively on opposite-hand threads of a turnbuckle-type bolt. Each clamping assembly has a cradle for receiving the respective pipe section, a releasable U-bolt clamp for holding the pipe section on the cradle, and pairs of angled adjusting screws for engaging the pipe section and adjusting its alignment both longitudinally and laterally.

Prior art U.S. Pat. No. 4,415,188, issued Nov. 15, 1983 to Ginter, Jr., illustrates a clamping member for securing pipe portions of an automobile exhaust system. The clamping member comprises first and second generally vertically extending end flanges and a generally horizontally extending section intermediate of and interconnecting the first and second end flanges. Each of the end flanges has a cutout portion for reception of a pipe portion to be clamped therein and first and second sleeve portions adjacent opposite sides of the respective end flange for reception of the ends of a U-bolt. The first and second end flanges, the section interconnecting the first and second end flanges, and the sleeve portions are formed from a one-piece blank.

Prior art U.S. Pat. No. 4,262,943, issued Apr. 21, 1981 to Armstrong, shows a muffler clamp device that comprises a longitudinal base member, the opposite ends of which are upright and formed to seat the muffler sleeve and the connecting tail pipe end. U-bolts are provided that encircle the muffler sleeve and the connecting tail pipe end at longitudinally spaced planes. The object of this invention is to clamp the muffler sleeve and tail pipe end separately at longitudinally spaced locations to rigidly support the connecting ends relative to each other and relative to the longitudinal base member.

Prior art U.S. Pat. No. 4,936,500, issued Jun. 26, 1990 to McClure, indicates a bolt-type boiler wall tube tool in which boiler tubes in the form of a wall can be clampingly secured to retain adjacent ends of the boiler tubes forming the wall in aligned relation when connecting the ends of the boiler wall tubes by welding.

Prior art U.S. Pat. No. 5,481,793, issued Jan. 9, 1996 to McClure, puts forth a hook and bolt type boiler wall tube tool for clamping together adjacent ends at a juncture of a boiler wall tube in a boiler wall. The tool includes first and second opposing clamping members, each clamping member including a recess suitable for engaging an exterior surface of a tube and for extending across the juncture of a tube. A pair of slots which are spaced from each other and substantially aligned with the slots on the other clamping member are provided in each clamping member. The slots on the first clamping member include sloped edges terminating at an outer portion thereof. A hook-and-bolt member secures the clamping members around the tube segments. The hook-and-bolt member includes a pair of hook arms for extending through the slots of the clamping members and suitable for passing through a spacing between laterally adjacent boiler tubes. Each end of the hook arms terminates in hooked ends for engaging the sloped edges on the slots of the first clamping member. A bolt passing through threads in the handle engages a front face of the second clamping member and applies force to pull the first clamping member towards the second clamping member.

Prior art U.S. Pat. No. 4,846,391, issued Jul. 11, 1989 to McClure, concerns a boiler wall tube tool in which boiler tubes in the form of a wall can be clampingly secured to retain adjacent ends of the boiler tubes forming the wall in aligned relation when connecting the ends of the boiler tubes, which form the wall, when being joined by welding.

What is needed is a boiler tube clamp to secure together two boiler tube ends for welding the ends together, which boiler tube clamp creates a secure clamping of the boiler tube ends together while still providing a maximum exposed area of the circumference of the boiler tube ends for welding them together, is easy to use, and adjustable to fit a variety of boiler tube sizes.

SUMMARY OF THE INVENTION

An object of the present invention is to provide a boiler tube clamp formed of a narrow elongated rigid bar with a V-shaped channel to receive the two boiler tube ends aligned in the channel and two C-clamps bolted to the bar with one C-clamp on each boiler tube end to secure together two boiler tube ends for welding the ends together with a secure clamping of the boiler tube ends together while still providing a maximum exposed area of the circumference of the boiler tube ends for welding them together.

Another object of the present invention is to provide two C-clamps loosened to fit the boiler tube ends and tightened to secure them making the clamp easy to use, and adjustable to fit a variety of boiler tube sizes.

One more object of the present invention is to provide a boiler tube welding clamp formed of a stamped metal bar with two adjustable standard C-clamps bolted to it, which is easy and inexpensive to manufacture.

An additional object of the present invention is to provide a boiler tube welding clamp that is small enough to fit in a confined space, which is normal for boiler erection and repair.

A further object of the present invention is to provide a boiler tube welding clamp that allows good visibility to the inside diameter of the tubing, which is needed for proper fit up.

Still another object of the present invention is to provide two jacking screws, one at each end of the V-shaped channel for better interior tube alignment when the mating surfaces or outside diameters of the boiler tubes are not exactly the same to enable better alignment of the inside diameters for a smoother flow through the tubes.

A contributory object of the present invention is to provide a boiler tube welding clamp that allows more than half of the welded root pass to be completed before removing the clamp, which keeps the two boiler tubes in alignment so that the remainder of the welding may be completed Once again another object of the present invention is to provide a boiler tube welding clamp that does not require any devices other than the supplied U-shaped bolts and a tool to tighten the nuts on said bolts to make it work.

In brief, a boiler tube clamp device for clamping together and aligning a mating pair of boiler tube ends to enable welding the two boiler tube ends together. The device comprises a narrow elongated rigid bar comprising a V-shaped channel to receive a mating pair of boiler tube ends aligned in the channel. The rigid bar is configured so that the width of the V-shaped channel spans less than half a circumference of a boiler tube. The rigid bar is formed of a stamped metal bar. The device also comprises a flange rigidly secured to the V-shaped channel, the flange having a series of paired openings therethrough spaced apart along the length of the bar, which are configured to fit two standard U-bolts therein.

The device further comprises two U-bolts bolted to the bar. Each U-bolt is secured through a pair of openings in the flange so that one U-bolt secures an end of one boiler tube positioned in the V-shaped channel and the other U-bolt secures an end of a mating boiler tube positioned in the V-shaped channel with the ends of the boiler tubes aligned and secured together in an exposed area between the U-bolts. In this position, the entire circumferences of the ends of the boiler tubes not positioned within the V-shaped channel are exposed for welding the boiler tube ends together. The two U-bolts are secured in the flange by nuts so that the two U-bolts may be loosened to fit the boiler tube ends and tightened to secure and align the boiler tube ends in the V-shaped channel. The U-bolts are adjustable in the length of the U-bolts protruding from the flange so that the device may accommodate a variety of boiler tube sizes.

Two jacking screws are adjustably screwed through two threaded holes at the interior joint of the two sides of the V-shaped channel, one at each end of the V-shaped channel, for better interior tube alignment when the mating surfaces or outside diameters of the boiler tubes are not exactly the same to enable better alignment of the inside diameters for a smoother flow through the tubes.

An advantage of the present invention is that it is user friendly.

Another advantage of the present invention is that it is compact in size.

An additional advantage of the present invention is that it only requires a wrench for installation.

One more advantage of the present invention is that it fits various sizes of tubing.

Yet another advantage of the present invention is that it allows good visibility to the tubing.

Still another advantage of the present invention is that it allows for a longer welding pass.

A further advantage of the present invention is that it is easy and inexpensive to manufacture.

Still another advantage of the present invention is that it enables better tube alignment for a smoother flow through the tubes.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
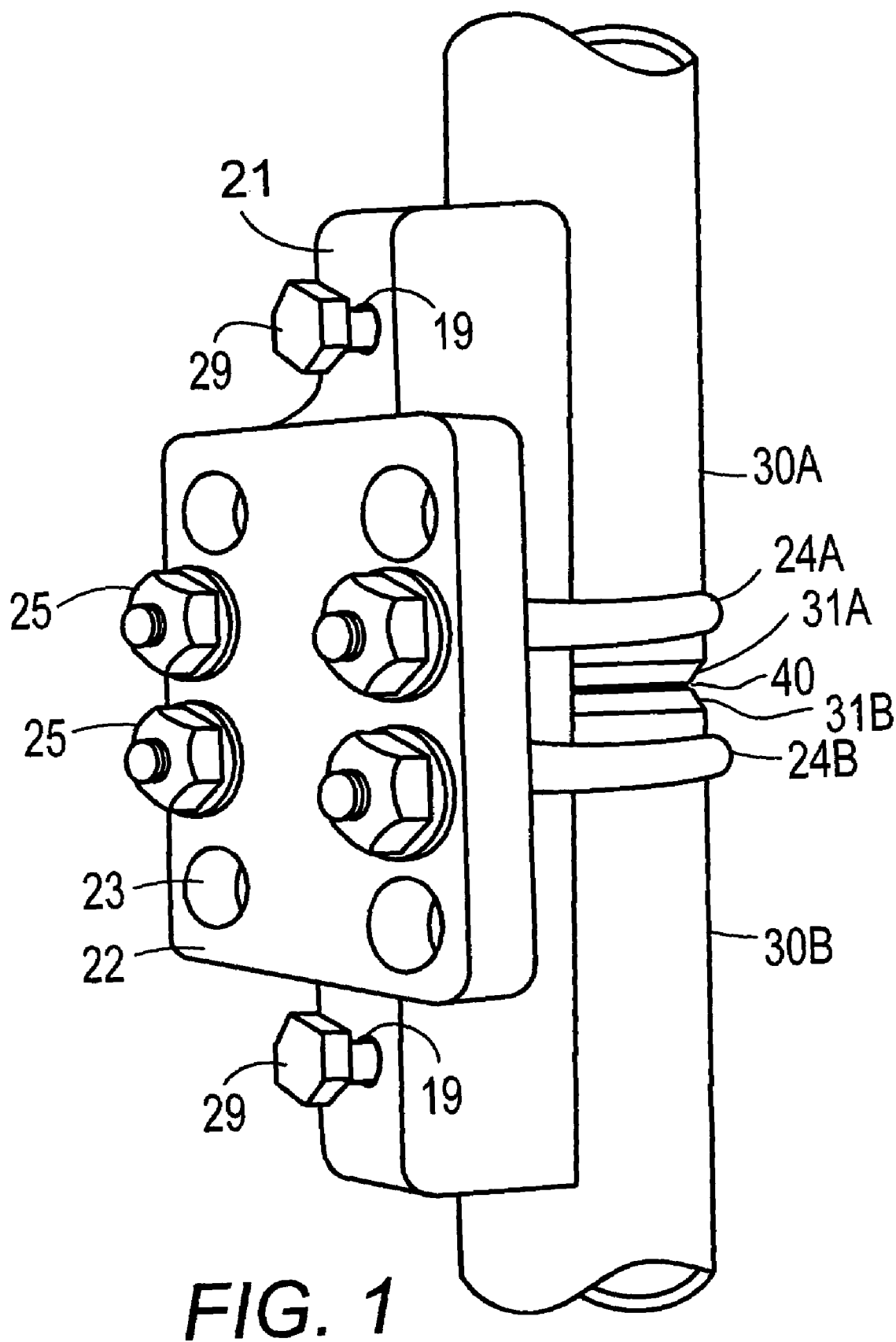
FIG. 1 is a perspective view of the boiler tube clamp device of the present invention with a pair of mating boiler tube ends clamped together vertically within the boiler tube clamp device.
Figure 2:
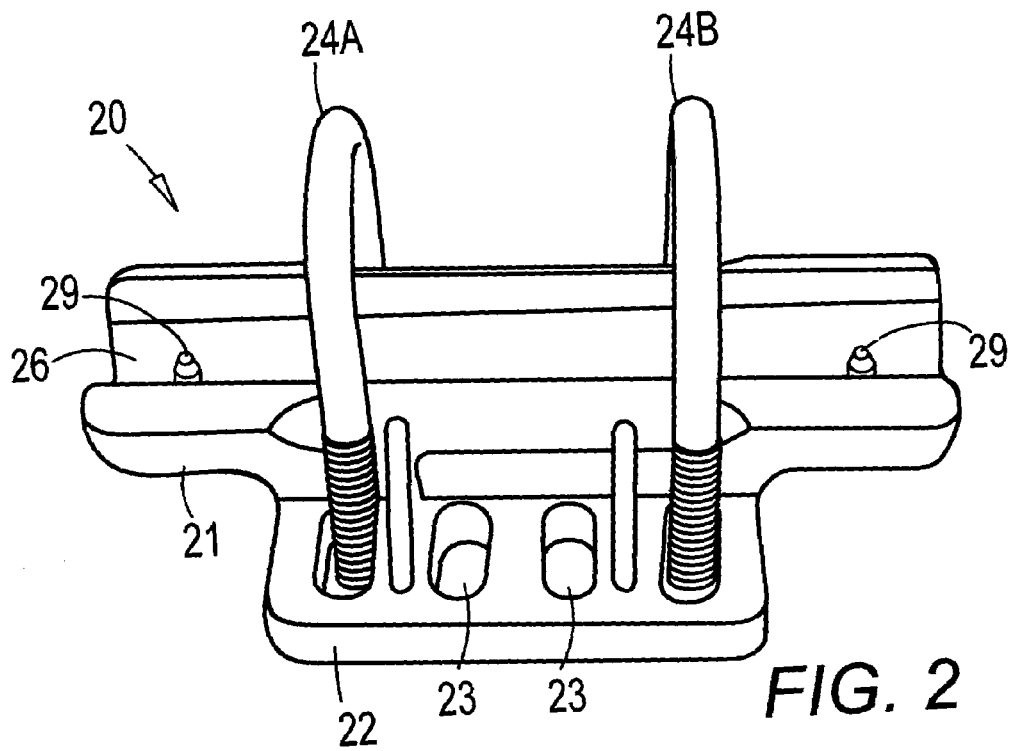
FIG. 2 is a perspective view of the boiler tube clamp device of the present invention showing the positioning of the U-bolts in the openings in the flange.
Figure 3:
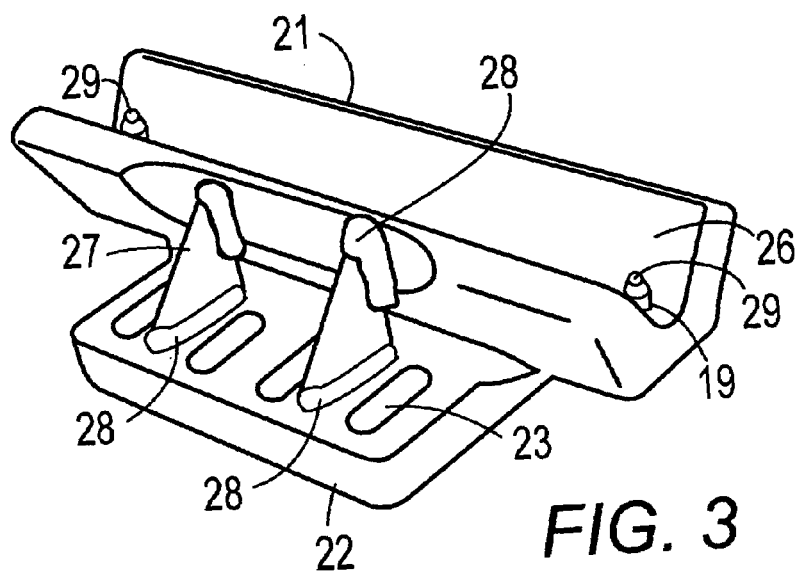
FIG. 3 is a perspective view of the boiler tube clamp of the invention showing the rigid attachment of the flange to the V-shaped channel in the body of the clamp.

In FIGS. 1–3, a boiler tube clamp device 20 for clamping together and aligning a mating pair of boiler tube ends 30A and 30B to enable welding the two boiler tube flange ends 31A and 31B together. The device 20 comprises a narrow elongated rigid bar 21 comprising a V-shaped channel 26 to receive a mating pair of boiler tube ends 31A and 31B aligned in the channel 26. The rigid bar 21 is formed of a stamped metal bar and is configured so that the width of the V-shaped channel 26 spans less than half a circumference of a boiler tube 30A or 30B.

The device 20 also comprises a flange 22 rigidly secured to the V-shaped channel 26. The flange 22 has a series of paired openings 23 therethrough spaced apart along the length of the bar 21, which are configured to fit two standard U-bolts 24A and 24B therein, as shown in FIG. 2.

The device 20 further comprises two U-bolts 24A and 24B bolted to the bar 21. Each U-bolt 24A and 24B is secured through a pair of openings 23 in the flange 22 so that one U-bolt 24A secures an end of one boiler tube 30A positioned in the V-shaped channel 26 and the other U-bolt 24B secures an end of a mating boiler tube 30B positioned in the V-shaped channel 26 with the flange ends of the boiler tubes 31A and 31B aligned and secured together in an exposed area between the U-bolts 24A and 24B. In this position, seen in FIG. 1, the entire circumferences of the mating edges 40 of the flange ends 31A and 31B of the boiler tubes 30A and 30B not positioned within the V-shaped channel 26 are exposed for welding the boiler tube flange ends 31A and 31B together. The two U-bolts 24A and 24B are secured in the flange 22 by nuts 25 so that the two U-bolts 24A and 24B may be loosened to fit the boiler tube ends 30A and 30B and tightened to secure and align the boiler tube flange ends 31A and 31B in the V-shaped channel 26. The U-bolts 24A and 24B are adjustable in the length of the U-bolts 24A and 24B protruding from the flange 22 so that the device 20 may accommodate a variety of boiler tube 30A and 30B sizes.

In FIGS. 1–3, two jacking screws 29 are adjustably screwed through two threaded holes 19 at the interior joint of the two sides of the V-shaped channel 26, one at each end of the V-shaped channel, for better interior tube alignment when the mating surfaces or outside diameters of the boiler tubes are not exactly the same to enable better alignment of the inside diameters for a smoother flow through the tubes.

In practice, the boiler tube alignment device 20 may be used in a confined space, which is common for boiler erection and repair. The body of the clamp 21 with the V-shaped channel fits against the two ends of the boiler tubes 30A and 30B on one side without contacting the web separating the boiler tubes. The U-bolts 24A and 24B slip through holes drilled in the web and are bolted to the body of the clamp 21. The two jacking screws 29 are adjusted if necessary for exact interior alignment of the boiler tubes. More than half the circumference of the mating ends 40 of the two tubes 30AA and 30B is exposed for welding. The use of the device 20 is extended to all pipe welding and is not limited to boiler tube repair and installation.

It is understood that the preceding description is given merely by way of illustration and not in limitation of the invention and that various modifications may be made thereto without departing from the spirit of the invention as claimed.

What is claimed is:

1. A boiler tube clamp device for clamping together and aligning a mating pair of boiler tube ends to enable welding the two boiler tube ends together, the device comprising:
   a narrow elongated rigid bar comprising a V-shaped channel to receive a mating pair of boiler tube ends aligned in the channel, the rigid bar configured so that the width of the V-shaped channel spans less than half a circumference of a boiler tube, and a flange rigidly secured to the V-shaped channel, the flange having a series of paired openings therethrough spaced apart along the length of the bar;
   two U-bolts bolted to the bar with each U-bolt secured through a pair of openings in the flange so that one U-bolt is adapted to secure an end of one boiler tube positioned in the V-shaped channel and the other U-bolt is adapted to secure an end of a mating boiler tube positioned in the V-shaped channel with the ends of the boiler tubes aligned and secured together in an exposed area between the U-bolts so that the entire circumferences of the ends of the boiler tubes not positioned within the V-shaped channel are exposed for welding the boiler tube ends together; and
   two jacking screws adjustably screwed through two threaded holes at an interior joint of two sides of the V-shaped channel, one at each end of the V-shaped channel, for better interior tube alignment when the mating surfaces or outside diameters of the boiler tubes are not exactly the same to enable better alignment of the inside diameters for a smoother flow through the tubes.

2. The device of claim 1 wherein the two U-bolts are secured in the flange by nuts so that the two U-bolts are adapted to be loosened to fit the boiler tube ends and tightened to secure and align the boiler tube ends in the V-shaped channel.

3. The device of claim 2 wherein the U-bolts are adapted to be adjustable in the length of the U-bolts protruding from the flange so that the device is adapted to accommodate a variety of boiler tube sizes.

4. The device of claim 1 wherein the rigid bar is formed of a stamped metal bar and the flange and paired openings are configured to fit two standard U-bolts therein.

* * * * *